(12) United States Patent
Li et al.

(10) Patent No.: US 12,117,302 B2
(45) Date of Patent: Oct. 15, 2024

(54) VEHICLE WITH HYBRID BATTERY PACK AND HUMAN-MACHINE INTERFACE AND METHOD OF MONITORING

(71) Applicant: GM Global Technology Operations LLC, Detroit, MI (US)

(72) Inventors: Wei Li, Troy, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1037 days.

(21) Appl. No.: 17/070,096

(22) Filed: Oct. 14, 2020

(65) Prior Publication Data

US 2021/0025723 A1  Jan. 28, 2021

Related U.S. Application Data

(63) Continuation of application No. 15/877,416, filed on Jan. 23, 2018, now Pat. No. 10,907,981.

(51) Int. Cl.
*G01C 21/34* (2006.01)
*B60L 58/12* (2019.01)
*G01C 21/36* (2006.01)

(52) U.S. Cl.
CPC .......... *G01C 21/3469* (2013.01); *B60L 58/12* (2019.02); *G01C 21/3655* (2013.01);
(Continued)

(58) Field of Classification Search
CPC ............ G01C 21/3469; G01C 21/3655; G01C 21/3667; G01C 21/3697; B60L 58/12; B60L 2240/62; Y02E 60/10; Y02T 90/16; B60W 50/14; H01M 10/482; H01M 10/488
(Continued)

(56) References Cited

U.S. PATENT DOCUMENTS

2013/0030739 A1\* 1/2013 Takahashi ............ G01R 31/392
702/63
2014/0163854 A1\* 6/2014 Matsumoto ........ G01C 21/3667
701/123
(Continued)

FOREIGN PATENT DOCUMENTS

CN   102673422 A   9/2012
CN   104986160 A   10/2015
(Continued)

*Primary Examiner* — Muhammad Shafi
(74) *Attorney, Agent, or Firm* — Quinn IP Law (57) ABSTRACT

A vehicle includes an electric motor and a battery operable to provide electrical power to the electric motor. The battery system includes a first battery pack and a second battery pack. The first battery pack has a relatively high power density, and the second battery pack has a relatively high energy density. An electronic controller determines a remaining driving range of the first battery pack, and a remaining driving range of the second battery pack. The vehicle has a human-machine interface (HMI) operatively connected to the electronic controller and configured to indicate the remaining driving range of the first battery pack and the remaining driving range of the second battery pack. The controller executes a method of monitoring the battery system.

18 Claims, 5 Drawing Sheets

(52) U.S. Cl.
CPC ..... *G01C 21/3667* (2013.01); *G01C 21/3697* (2013.01); *B60L 2240/62* (2013.01)

(58) Field of Classification Search
USPC ........................................................ 701/516
See application file for complete search history.

(56) References Cited

U.S. PATENT DOCUMENTS

2014/0184161 A1    7/2014  Deal et al.
2014/0186659 A1*   7/2014  Dhar ..................... B60L 50/62
                                                        429/9

FOREIGN PATENT DOCUMENTS

WO    WO2008143355 A1 *  11/2008
WO    WO-2013011880 A1 *  1/2013   ............. B60K 35/00

\* cited by examiner

VEHICLE WITH HYBRID BATTERY PACK AND HUMAN-MACHINE INTERFACE AND METHOD OF MONITORING

CROSS-REFERENCE TO RELATED APPLICATION

This application is a continuation of and claims the benefit of priority to United Stated application Ser. No. 15/877,416 filed Jan. 23, 2018, which is incorporated by reference in its entirety.

INTRODUCTION

Electric vehicles may be propelled by electric motors that are powered solely by electrical energy provided by rechargeable batteries. Hybrid vehicles may also depend in part on rechargeable batteries for motive power. High power batteries are generally capable of fast charging and discharging. High energy batteries provide a longer driving range per unit of volume or weight than high power batteries, but are less able to quickly charge and recharge than high power batteries and have more limited lifetime charging cycles.

SUMMARY

A vehicle includes an electric motor configured to provide motive torque at wheels of the vehicle, and a battery system operatively connected to the electric motor. The battery system is operable to provide electrical power to the electric motor. The battery system includes a first battery pack and a second battery pack. The first battery pack has a relatively high power density in comparison to the second battery pack, and the second battery pack has a relatively high energy density in comparison to the first battery pack. The vehicle also includes an electronic controller configured to determine a remaining driving range of the first battery pack, and a remaining driving range of the second battery pack. The vehicle has a human-machine interface (HMI) operatively connected to the electronic controller and configured to indicate the remaining driving range of the first battery pack and the remaining driving range of the second battery pack. The HMI may include a display screen, in which case the remaining driving range is indicated visually. In other embodiments, the remaining driving range could be indicated aurally, such as over an audio system.

In this manner, a vehicle operator is made aware of the remaining driving ranges of both battery packs. Relatively high energy battery packs are typically less durable and have a lower number of lifetime charging cycles before the ability to charge the battery pack degrades. Because the operator is made aware of the remaining driving ranges of both battery packs, this may encourage the operator to recharge the high power battery pack more frequently, thus potentially lessening the frequency of recharging the high energy battery pack and preserving its useful life over a longer term, especially in a vehicle in which the charge of the high power energy pack is used prior to the charge of the high energy battery pack to meet driving needs.

In one or more embodiments, the HMI includes at least one display screen. The remaining driving range of the first battery pack is displayed as a first image on the at least one display screen, and the remaining driving range of the second battery pack is displayed as a second image on the at least one display screen. The first image and second image may be displayed concurrently. For example, the first image may be a first rotary gauge, and the second image may be a second rotary gauge. Rotary gauges are often used to display fuel level on vehicles with internal combustion engines. Accordingly, a vehicle driver may be prompted to recharge earlier when made aware of a low charge level of the first battery pack, for example, then if only made aware of the combined charge level of both battery packs. In other embodiments, the image may be a number.

In one or more embodiments, the vehicle includes a navigation system operatively connectable to the electronic controller. The electronic controller is configured to compare the remaining driving range of the first battery pack to a predetermined charge alert threshold driving range, and determine, via the navigation system, one or more charge stations within a predetermined distance of the vehicle if the remaining driving range of the first battery pack is less than the predetermined charge alert threshold driving range. The electronic controller then commands the HMI to indicate the one or more charge stations within the predetermined distance of the vehicle. For example, the HMI may include a display screen, and the HMI may indicate the one or more charge stations within the predetermined distance of the vehicle by listing the one or more charge stations within the predetermined distance of the vehicle on a display screen.

For example, the charge stations may be public and/or commercial charge stations that provide a higher current charge than does a charge at a private residence, and thus enable a faster charge, as is appropriate for a charge occurring during daily use of the vehicle as opposed to an overnight charge which may be slower without inconveniencing the vehicle operator.

In some embodiments, the vehicle is also equipped to provide information about remaining battery life to the vehicle operator. For example, in one or more embodiments, the electronic controller is configured to detect any second battery pack charging event, and command the HMI to indicate a number of remaining charging cycles of the second battery pack based on the second battery pack charging event. The second battery pack charging event detected and tracked by the electronic controller may be from an external charge source, or may be from a regenerative braking event.

The electronic controller is able to estimate the remaining charging cycles of the second battery pack in a number of ways. For example, the second battery pack may have a cycle life of a predetermined maximum number of charging cycles, each of the charging cycles including charging the second battery pack with a maximum amount of energy (Watt-hours) of the second battery. The electronic controller may be configured to track lifetime remaining charging cycles of the second battery pack. For example, for each second battery pack charging event, whether from an external charge source or due to regenerative braking, the controller may be configured to determine an amount of energy received by the second battery pack, determine a ratio of the amount of energy received by the second battery pack to the maximum amount of energy of the second battery, and decrement the ratio from lifetime remaining charging cycles. The lifetime remaining charging cycles has an initial value of the predetermined maximum number of charging cycles.

In one or more embodiments, the controller may determine a rounded lifetime remaining charging cycle value by rounding the lifetime remaining charging cycles to a nearest whole number. The number of remaining charging cycles indicated by the HMI is the rounded lifetime remaining charging cycle value. For example, rounding the lifetime remaining charging cycles to a nearest whole number may include rounding any lifetime remaining charging cycles value ending in a decimal greater than or equal to 0.5 up to the next whole number. Alternatively, remaining charging cycles indicated by the HMI could include fractions of a remaining charge cycle.

A method of monitoring a battery system for a vehicle includes determining, via an electronic controller, a remaining driving range of the first battery pack, and a remaining driving range of the second battery pack. The first battery pack has a relatively high power density in comparison to the second battery pack, and the second battery pack has a relatively high energy density in comparison to the first battery pack. The method includes commanding a human-machine interface (HMI) operatively connected to the electronic controller to indicate the remaining driving range of the first battery pack and the remaining driving range of the second battery pack.

The above features and advantages and other features and advantages of the present disclosure are readily apparent from the following detailed description of the best modes for carrying out the disclosure when taken in connection with the accompanying drawings.

DETAILED DESCRIPTION

Figure 1:
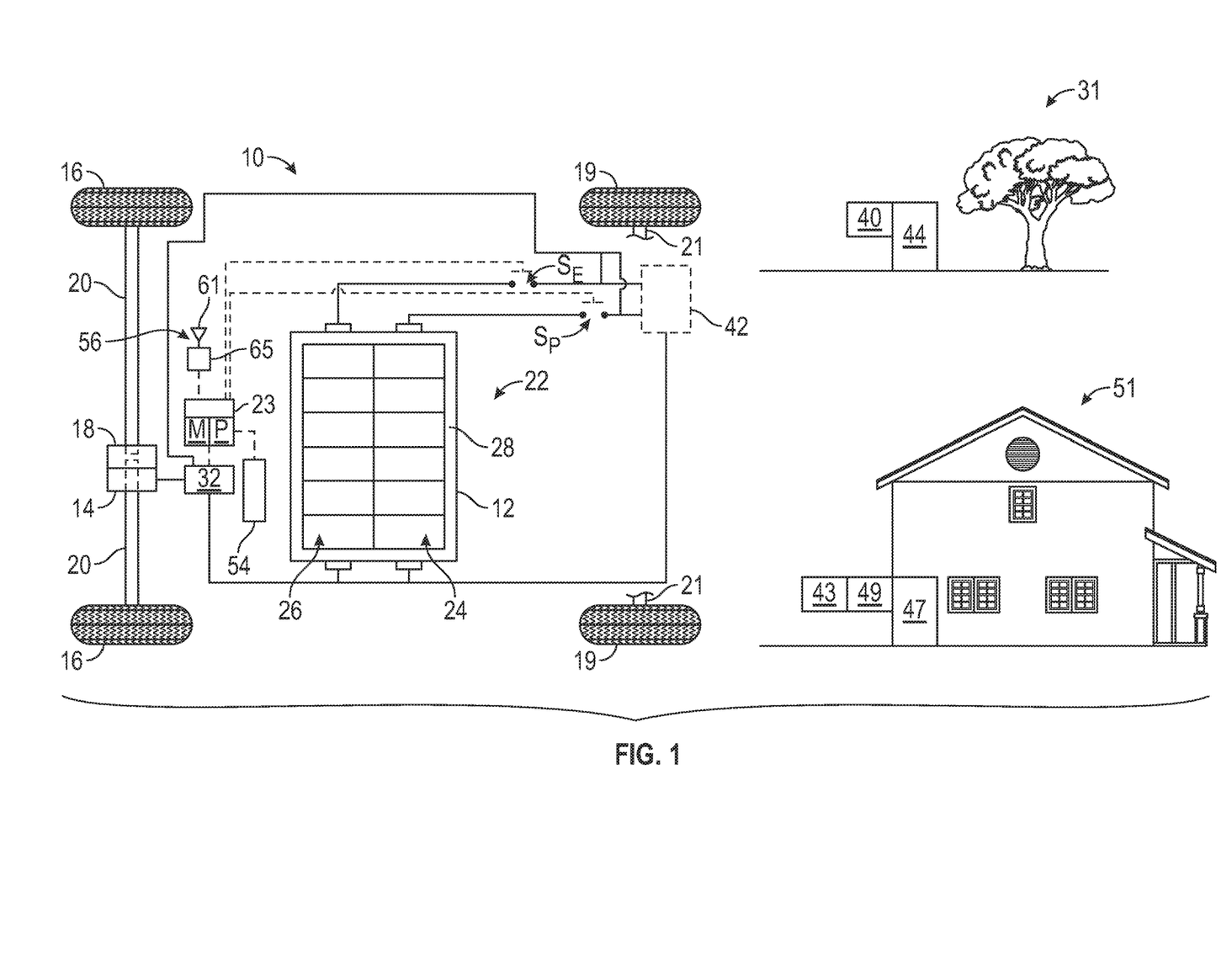
FIG. 1 is a schematic illustration of an electric vehicle having an energy management system including a hybrid battery pack, and showing a residential and fast charge station for the vehicle.

Referring to the drawings, wherein like reference numbers refer to like components throughout the views, FIG. 1 shows an electric vehicle 10. The electric vehicle 10 is powered solely by electric power provided from a hybrid battery pack 12 to one or more electric machines 14 that provide motive force to front vehicle wheels 16 and may be referred to as an "all-electric" vehicle. One electric machine 14 is shown operatively connected to front wheels 16 via a gearing arrangement 18 and half shafts 20. In various embodiments, an additional electric machine (not shown) may be similarly operatively connected to the rear wheels 19, an electric machine could be connected to the rear wheels 19 with no electric machine connected to the front wheels 16, or each wheel may be operatively connected to a separate electric machine. Rear half shafts 21 are shown in fragmentary view in FIG. 1. The electric machine 14 is configured to be operable as a motor during a driving mode of the vehicle 10, and as a generator such as during regenerative braking of the vehicle 10.

Although depicted on an electric vehicle 10, the hybrid battery pack 12, energy management system 22 and method 100 described herein may be applicable to a hybrid electric vehicle that utilizes the hybrid battery pack to power one or more electric motors for propulsion, and that also has an internal combustion engine as a source of motive power (e.g., a hybrid electric vehicle).

Figure 2:
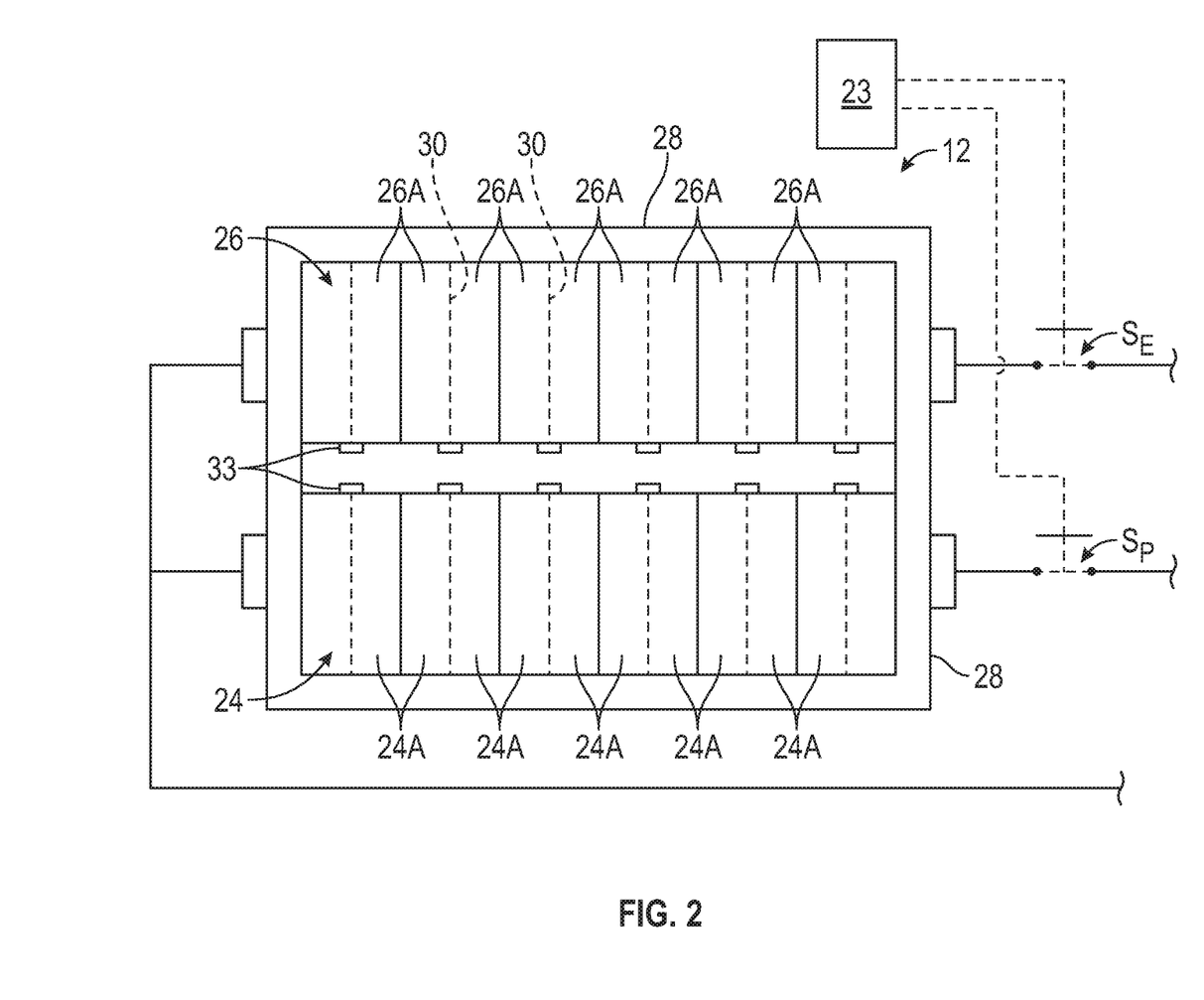
FIG. 2 is a schematic illustration of a portion of the energy management system of FIG. 1, including the hybrid battery pack.

The hybrid battery pack 12 is part of an energy management system 22 and may be referred to as a "hybrid" battery pack as it integrates both a relatively high (i.e., high power density) first battery pack 24 (referred to as a high power battery pack 24 or a power battery pack 24), and a relatively high energy (i.e., high energy density) second battery pack 26 (referred to as a high energy battery pack or an energy battery pack 26). The hybrid battery pack 12 includes a housing 28 that supports and retains both the high power battery pack 24 and the high energy battery pack 26 in a single, unitary construction. With reference to FIG. 2, the high power battery pack 24 includes a first set of battery cells 24A connected in series and/or parallel with one another (the high power battery cells 24A) and the high energy battery pack 26 includes a second set of battery cells 26A connected in series and/or parallel with one another (the high energy battery cells 26A) and adjacent to the high power battery cells 24A in the housing 28.

The energy management system 22 includes an electronic controller 23 that executes a method 100 of monitoring the battery system 22 that informs the vehicle operator of the state-of-charge of the battery packs 24, 26, and the remaining cycle life of the high energy battery pack 26, and may thereby result in the vehicle operator charging the high power battery pack 24 more frequently than otherwise, which may elongate the life of the high energy battery pack 26. The high energy battery pack 26 is less durable than the high power battery pack 24 with respect to charging cycles. Additionally, the high energy battery pack 26 is less able to receive a "fast" charge (i.e., a relatively high current in a relatively short time period), as may be associated with commercial, non-residential charging stations.

The electronic controller 23 may be used to control ongoing operation of the hybrid battery pack 12 via the transmission of control signals to switches SE and SP. When the switch SE is closed, the high energy battery pack 26 is able to be charged and/or discharged. When the switch SP is closed, the high power battery pack 24 is able to be charged and discharged. The electronic controller 23 may be embodied as one or more electronic control units having a requisite memory M and a processor P, as well as other associated hardware and software, e.g., a clock or timer, input/output circuitry, etc. Memory M may include sufficient amounts of read only memory, for instance magnetic or optical memory. Instructions embodying the method 100 may be programmed as computer-readable instructions into the memory M and executed by the processor P during operation of the vehicle 10.

The energy management system 22 is configured and the method 100 is designed so that the high power battery pack 24 is charged and discharged separately from the high energy battery pack 26. Stated differently, the high power battery pack 24 is not used to charge the high energy battery pack 26, the high energy battery pack 26 is not used to charge the high power battery pack 24, the high power battery pack 24 may be discharged without discharging the high energy battery pack 26, and the high energy battery pack 26 may be discharged without discharging the high power battery pack 24.

The high energy battery pack 26 has a relatively high energy density in comparison to the high power battery pack 24 (i.e., energy per unit of weight or per unit of size, such as in kilowatt-hours per kilogram (kWh/kg) or kilowatt-hours per liter (kWh/l)), and extends the range of the vehicle 10 in comparison to a battery system having the high power battery pack 24 but not the high energy battery pack 26. The high energy battery pack 26 may have a high internal resistance, limiting its ability to accept high current to charge quickly. For example, the high energy battery pack 26 may have an energy density in kilowatt-hours per kilogram or per liter at least 50% greater than the energy density of the high power battery pack. In one embodiment, the high energy battery pack 26 includes Lithium-metal based energy battery cells 26A with 400 Wh/kg energy density, and the high power battery pack 24 includes lithium-titanate based battery cells 24A of about 100 Wh/kg energy density. In this case, the high energy battery pack 26 has about 300% greater specific energy relative to the high power battery pack 24. In another embodiment, the high energy battery pack 26 includes Lithium-Ion based energy battery cells 26A with 250 Wh/kg energy density, and the high power battery pack 24 includes Lithium-Ion based battery cells 24A of about 150 Wh/kg energy density. In this case, the high energy battery pack 26 has about 67% greater specific energy relative to the high power battery pack 24.

The high power battery pack 24 has a relatively high power density in comparison to the high energy battery pack 26 (i.e., power per unit of size or per unit of weight, such as in kilowatts per kilogram or per liter). For example, the high power battery pack 24 may have a power density in kilowatts per kilogram or per liter at least 100% greater than the power density of the high energy battery pack 26. Using allowable charging rate as a rough estimate of the power density of the battery packs 24, 26, in an embodiment, the high power battery pack 24 includes battery cells 24A that can charge at the 4C rate for 80% state-of-charge (SOC), and the high energy battery pack 26 includes battery cells 26A that can typically charge at about the C/3 rate. In this embodiment, the high power battery pack 24 thus has roughly 1100% greater power density than the high energy battery pack 26. The 1C rate corresponds to the current needed to charge the battery from a fully discharged state to the fully charged state in one hour. The 4C rate corresponds to the current needed to charge the battery from a fully discharged state to the fully charged state in one quarter of an hour, or 15 minutes.

The high power battery pack 24 has the advantage of an ability to accept higher current during charging than the high energy battery pack 26, enabling what may be referred to as a "fast" charge that may be obtained from a charge source 31 (also referred to as a charge station, shown in FIG. 1) configured to provide relatively high current. The charge source 31 may be, for example, a public charging station rather than a private residence. The charge sources 31 may be public charge stations that provide a higher current recharge than does a recharge at a private residence, and thus enable a faster recharge. Access to such a charge source 31 enables the vehicle 10 to continue a driving excursion, and provides a quicker partial or full recharge of the high power battery pack 24, as explained herein.

Placement of a charging device at the charging port 42 is indicative of a charging event, and the controller 23 is configured to detect a charging event such as by sensors at the charging port 42, and/or by sensors 33 at the battery cells 24A, 26A. Charging devices include the fast charging device 40 or a home charging device 43. The home charging device 43 which provides current through a DC converter 49 connected to an AC charge source 47, such as may be available at an operator's home 51 for overnight charging. FIG. 1 shows a fast charging device 40 that may be placed at the charge port 42 of FIG. 1 to operatively connect a power supply 44 to the energy management system 22 for recharging the high power battery pack 24 and/or the high energy battery pack 26. In general, if the method 100 prompts the vehicle operator to more frequently charge the high power battery pack 24, less frequent charging of the high energy battery pack 26 will occur. Generally, the energy management system 22 may prioritize charging and discharging of the high power battery pack 24 over the high energy battery pack 26 in order to reduce the frequency of charge cycles of the high energy battery pack 26.

The high power battery cells 24A are connected in parallel and/or series with one another and are constructed to provide or are composed of materials that provide greater power than the high energy battery cells 26A, and the battery pack 24 is therefore referred to as the high power battery pack or simply the power battery. Example materials for the high power battery pack 24 include battery cells with a negative electrode comprising one or more of a lithium titanate ($Li_{4+x}Ti_5O_{12}$, where 0≤x≤3), and various other Li—Ti—O materials (including Li—Ti—Sc—O, Li—Ti—Nb—O, and Li—Ti—Zn—O), or graphite, and a positive electrode comprising one or more of a nickel manganese cobalt oxide ($Ni_xMn_yCo_zO_2$), where the sum of x, y, and z is one), lithium manganese oxide ($LiMn_2O_4$ (spinel)), nickel manganese cobalt oxide (NMC), lithium nickel manganese cobalt oxide ($LiNiMnCoO_2$), and lithium iron phosphate ($LiFePO_4$).

The high energy battery cells 26A are connected in series and/or parallel with one another and are composed of materials that provide greater energy than the high power battery cells 24A, and the battery pack 26 is therefore referred to as the high energy battery pack or simply the energy battery. Example materials for the high energy battery pack 26 include battery cells with a negative electrode comprising one or more of graphite, or of silicon, or of silica, or of rechargeable lithium metal, and a positive electrode comprising one or more of a nickel manganese cobalt oxide ($Ni_xMn_yCo_zO_2$), where the sum of x, y, and z is one), lithium manganese oxide ($LiMn_2O_4$ (spinel)), nickel manganese cobalt oxide (NMC), lithium nickel manganese cobalt oxide ($LiNiMnCoO_2$), lithium iron phosphate ($LiFePO_4$), or a sulfur-based positive electrode.

The high power battery pack 24 may be configured to provide a predetermined maximum range of the vehicle 10 when fully charged, and to be able to receive an amount of power equivalent to a predetermined fraction of that maximum range during a fast charge (i.e., relatively high current charging) of a predetermined duration.

With reference to FIG. 2, each battery cell 24A, 26A includes an anode and a cathode (indicated on either side of a membrane 30 shown with dashed lines). One or more sensors 33 are in operative communication with each battery cell 24A, 26A and are operatively connected to the electronic controller 23 either directly or via a battery module controller (not shown). Selected ones of the membranes 30 and sensors 33 are indicated with reference numerals in FIG. 2 for clarity in the drawing. The sensors 33 are configured to monitor battery parameters during vehicle operation. For example, the sensors 33 may monitor parameters indicative of the respective state-of-charge of each battery cell 24A, 26A, such as voltage, current, temperature, etc. The electronic controller 23, or another controller operatively connected to the electronic controller 23, may include a state-of-charge estimator module that determines a state-of-charge based on the sensor data.

With reference to FIG. 2, the energy management system 22 includes a first switch SP operatively connected to the high power battery pack 24, and a second switch SE operatively connected to the high energy battery pack 26.

The first switch SP is also referred to as the power battery pack switch, and the second switch SE is also referred to as the high energy battery pack switch. When the first switch SP is open, the high power battery pack 24 is disconnected from the electric machine 14 and from the charge port 42. When the first switch SP is closed, the high power battery pack 24 is operatively connected to the electric machine 14 (during drive mode) and to the charge port 42 (during charge mode). When the second switch SE is open, the high energy battery pack 26 is disconnected from the electric machine 14 and from the charge port 42. When the second switch SE is closed, the high energy battery pack 26 is operatively connected to the electric machine 14 (during drive mode) and to the charge port 42 (during charge mode).

The first switch SP and the second switch SE are both shown in open positions in FIG. 2. The electronic controller 23 is operatively connected to each of the switches SE and SP, and is configured to selectively send a separate control signal to each of the switches SE and SP so that the switches SE and SP may be moved from the open position to a closed position (represented with dashed lines) independently of one another.

FIG. 1 shows the electric machine 14 (i.e., a load) that may be driven by or charged by either or both of the high power battery pack 24 and the high energy battery pack 26 depending on the respective positions of the first and second switches SE and SP. The electric machine 14 is depicted as an alternating current (AC) motor. A power inverter 32 is shown disposed between the electric machine 14 and the switches SE, SP. The power inverter 32 may be a three-phase power inverter with gate drives and a capacitive input filter. The power inverter 32 converts direct current (DC) provided from the high power battery pack 24 and/or the high energy battery pack 26 to alternating current (AC) for driving the electric machine 14 as a motor, and converts alternating current to direct current when functioning as a generator during regenerative braking.

The electronic controller 23 is configured to determine an operating parameter of the high power battery pack 24 that is indicative of a remaining driving range of the high power battery pack, and an operating parameter of the high energy battery pack 26 that is indicative of a remaining driving range of the high energy battery pack. For example, based on sensor signals provided by the sensors 33 to the electronic controller 23, the electronic controller 23 determines operating parameters of the battery cells 24A, 26A indicative of the respective state-of-charge of each battery cell 24A, 26A, such as voltage, current, temperature, etc.

Figure 3:
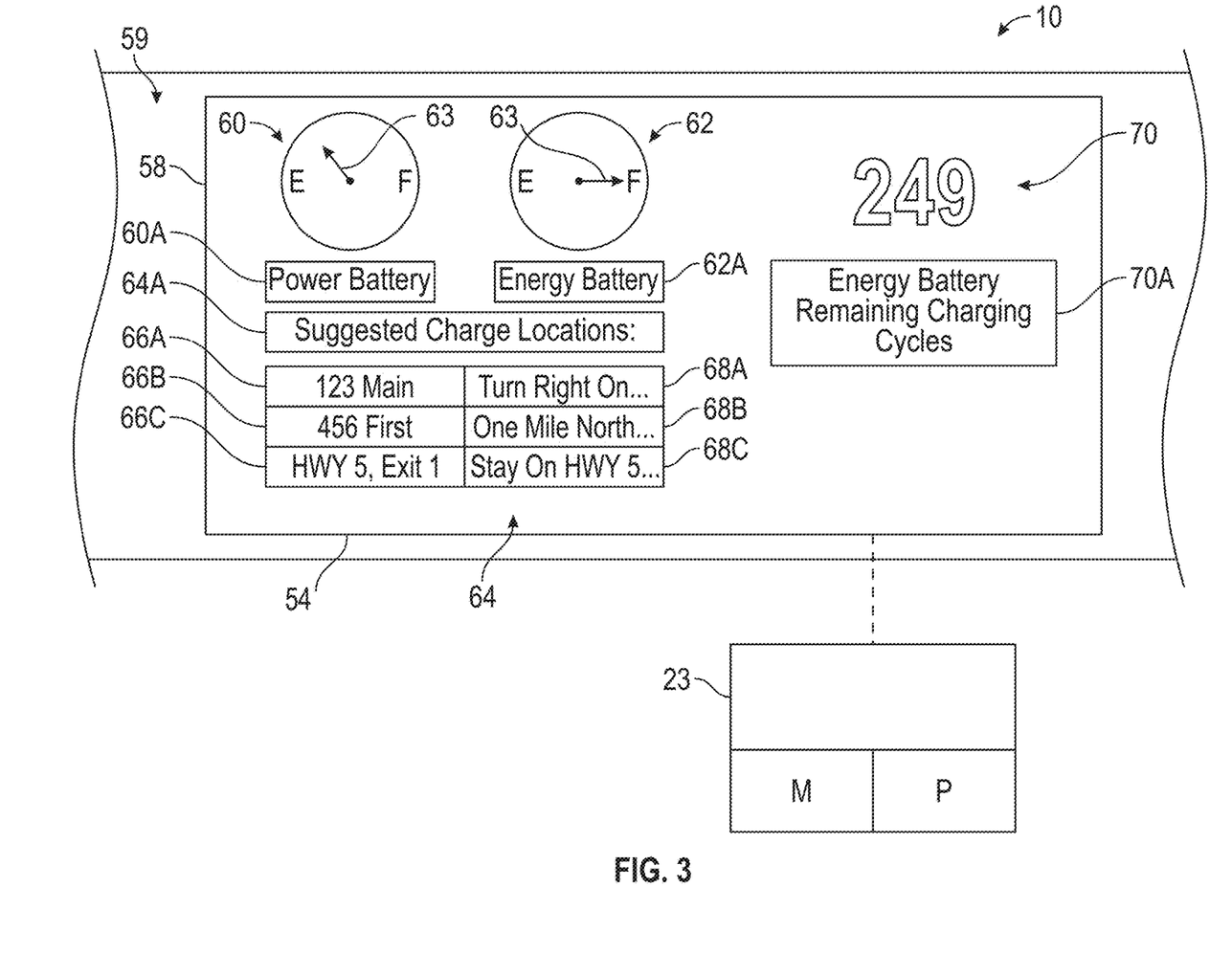
FIG. 3 is a schematic illustration of a human-machine interface (HMI) and an electronic controller included in the vehicle of FIG. 1.

As shown in FIG. 3, the vehicle 10 is equipped with a human-machine interface (HMI) 54 and a navigation system 56, both of which are operatively connected to the electronic controller 23. The human-machine interface (HMI) 54 is configured to indicate the remaining driving range of the high power battery pack 24 and the remaining driving range of the high energy battery pack 26. In the embodiment shown, the HMI 54 includes a display screen 58 such as on a dashboard 59 of the vehicle 10. The remaining driving range of the high power battery pack 24 is displayed as a first image 60 on the display screen 58, and the remaining driving range of the high energy battery pack 26 is displayed as a second image 62 on the display screen 58. An identifier 60A such as a label or image identifies the image 60 as the Power Battery Driving Range or similar identifier. An identifier 62A such as a label or an image identifies the image 62 as the Energy Battery Driving Range or similar identifier.

The first image 60 and second image 62 may be displayed concurrently. For example, the first image 60 is shown as a first rotary gauge, and the second image 62 is shown as a second rotary gauge. The remaining driving range of the high power battery pack 24 is indicated by the position of a needle 63 between an empty position (E) representing a zero state-of-charge of the high power battery pack 24, and a full position (F), representing a 100 percent state-of-charge of the high power battery pack 24. A similar needle 63 indicates the remaining driving range of the high energy battery pack 26. It should be appreciated that the charge capacity of the high power battery pack 24 and the charge capacity of the high energy battery pack 26 may decrease with time, so that a reading of full (i.e., the needle 63 at the full position (F)) at the beginning of the cycle life of the battery pack 24 may be greater than later in the cycle life of the battery pack 24 (i.e., after many charge cycles). A single display screen 58 is shown; however, the HMI 54 may instead include multiple display screens, such as a separate display screen for the remaining driving range for each of the battery packs 24, 26. Additionally, although shown on the dashboard 59, the one or more display screens 58 may be positioned elsewhere. For example, the one or more display screens may be a heads-up display, such as a projection on the vehicle windshield. Still further, the indication of the remaining driving range of the high power battery pack 24 and or the high energy battery pack 26 may be provided as an audio alert instead of a visual image. For example, the controller 23 may cause the vehicle audio system to announce the remaining driving range of each battery pack 24, 26 when requested, such as by the vehicle operator pushing a button or making a voice command to request the remaining driving range.

Figure 4:
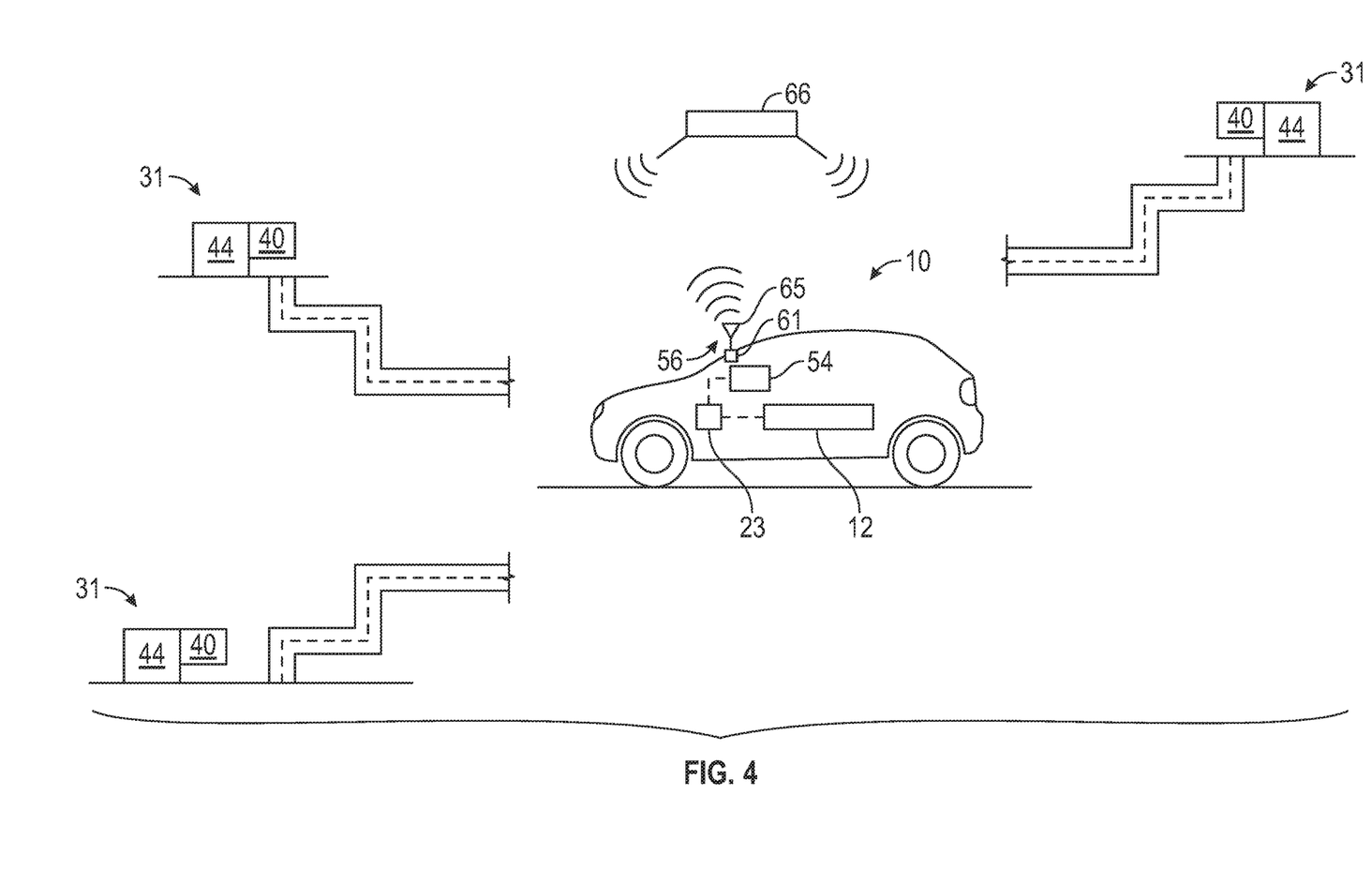
FIG. 4 is a schematic illustration of the vehicle of FIG. 1 with a navigation system for indicating surrounding fast charging stations.

With reference to FIG. 4, the navigation system 56 may include an antenna 61 and a global positioning system receiver 65 mounted on the vehicle 10 and operatively connectable to the electronic controller 23. The receiver 65 may wirelessly communicate with multiple satellites 66 (one shown) so that the electronic controller 23 determines the coordinate location of the vehicle 10, and fast charge stations 31 that are within a predetermined distance from the vehicle 10. For example, the electronic controller 23 is configured to compare the remaining driving range of the high power battery pack 24 to a predetermined charge alert threshold driving range, and determine, via the navigation system 56, one or more charge stations 31 within a predetermined distance of the vehicle 10 if the remaining driving range of the high power battery pack 24 is less than the predetermined charge alert threshold driving range. The predetermined distance of these charge stations 31 from the vehicle 10 is less than the predetermined charge alert threshold driving range so that the vehicle 10 may be charged at a selected one of these charge stations 31 before the high power battery pack 24 discharges to a minimum state-of-charge.

The electronic controller 23 then commands the HMI 54 to indicate the one or more charge stations 31 within the predetermined distance of the vehicle. For example, in response to a control signal from the electronic controller 23, the HMI may include an image 64 that includes an identifier 64A, "Suggested Charge Stations" or similar label, and lists the one or more charge stations 31 within the predetermined distance of the vehicle 10. For example, the names 66A, 66B, 66C of various charge stations may be listed. The address or directions 68A, 68B, 68C to each station may be listed, or may be available by touch on a selected one of the names, or by stating the name in a voice-activated display 58. The navigation system 56 is able to provide the directions based on the current location of the vehicle 10 and a stored database of locations of charge stations 31 that is accessed by the navigation system 56.

The predetermined charge alert threshold driving range and the associated predetermined distance of the charge stations 31 from the vehicle 10 may be selected to exceed an average distance between charge stations 31, and may vary based on the global position of the vehicle 10. For example, in some localities, there may be fewer charge stations 31, and the charge stations 31 may be spaced further apart from one another on average. When the vehicle 10 is in such locations, the predetermined charge alert threshold driving range may be set higher to prompt the vehicle operator to consider recharging at a higher remaining charge of the high power battery pack 24 than when the vehicle 10 is in the vicinity of more closely located charge stations 31.

The electronic controller 23 is also configured to detect a high energy battery charging event in order to provide information about remaining battery life to the vehicle operator. The sensors 33 may detect the state-of-charge of the battery cells 24A, 26A, and, by monitoring changes in the state-of-charge over time, detect full and partial discharges and charges in order to track charging cycles of the battery packs 24, 26.

The electronic controller 23 may command the HMI 54 to indicate a number of remaining charging cycles of the high energy battery pack 26 based on the high energy battery pack charging event. For example, as shown in FIG. 3, in response to a control signal from the electronic controller 23, the display 58 also provides an image 70 of the number of remaining charging cycles. An identifier 70A such as a label or image identifies the image 70 as the Energy Battery Remaining Charging Cycles. In the embodiment shown, the image 70 is a numerical value. As charging cycles occur, the numerical value is decreased. Accordingly, the image 70 is similar to an odometer operating in reverse, except that charging cycles are counted rather than miles driven. Alternatively, or in addition, a rotary gauge similar to those shown in images 60 and 62 may be used.

The electronic controller 23 can estimate the remaining charging cycles of the high energy battery pack 26 in a number of ways. For example, the high energy battery pack 26 may have a cycle life of a predetermined maximum number of charging cycles, each of the charging cycles including charging the high energy battery pack 26 with a maximum amount of energy (kilowatt-hours) of the high energy battery pack 26. The electronic controller 23 may be configured to track lifetime remaining charging cycles of the high energy battery pack 26.

For example, for each second battery charging event, the controller 23 may be configured to determine an amount of energy received by the high energy battery pack 26, determine a ratio of the amount of energy received by the high energy battery pack 26 to the maximum amount of energy of the high energy battery pack 26, and decrement the ratio from lifetime remaining charging cycles. The lifetime remaining charging cycles has an initial value of the predetermined maximum number of charging cycles. For example, in the embodiment shown, the predetermined maximum number of charging cycles of the high energy battery pack 26 is 250. The predetermined maximum number of charging cycles may be based on test data from testing in which test high energy battery packs 26 are subjected to repeated charge and discharge, and the predetermined maximum number of charging cycles may be an average based on the test data.

In the embodiment of FIG. 3, the HMI 54 displays the lifetime remaining charge cycle value as a whole number. The controller 23 may determine a rounded lifetime remaining charging cycle value by rounding the lifetime remaining charging cycles to a nearest whole number, and the number of remaining charging cycles the HMI 54 is commanded to display is the rounded lifetime remaining charging cycle value. For example, rounding the lifetime remaining charging cycles to a nearest whole number may include rounding a lifetime remaining charging cycles value ending in a decimal greater than or equal to 0.5 up to the next whole number. In other embodiments, remaining charge cycles could be displayed as including fractions of a remaining charging cycle.

As described with respect to vehicle 10, the controller 23 executes a method 100 of monitoring a battery system 22 for an electric vehicle. The method 100 is depicted as a flow diagram in FIG. 5. Various blocks shown in the flow diagram depicting method steps described herein may be performed by the controller 23 in a different order than shown, or some of the steps may be formed simultaneously. The method 100 may begin with step 102, in which the controller 23 determines a remaining driving range of the high power battery pack 24, and a remaining driving range of the high energy battery pack 26, as previously described.

Figure 5:
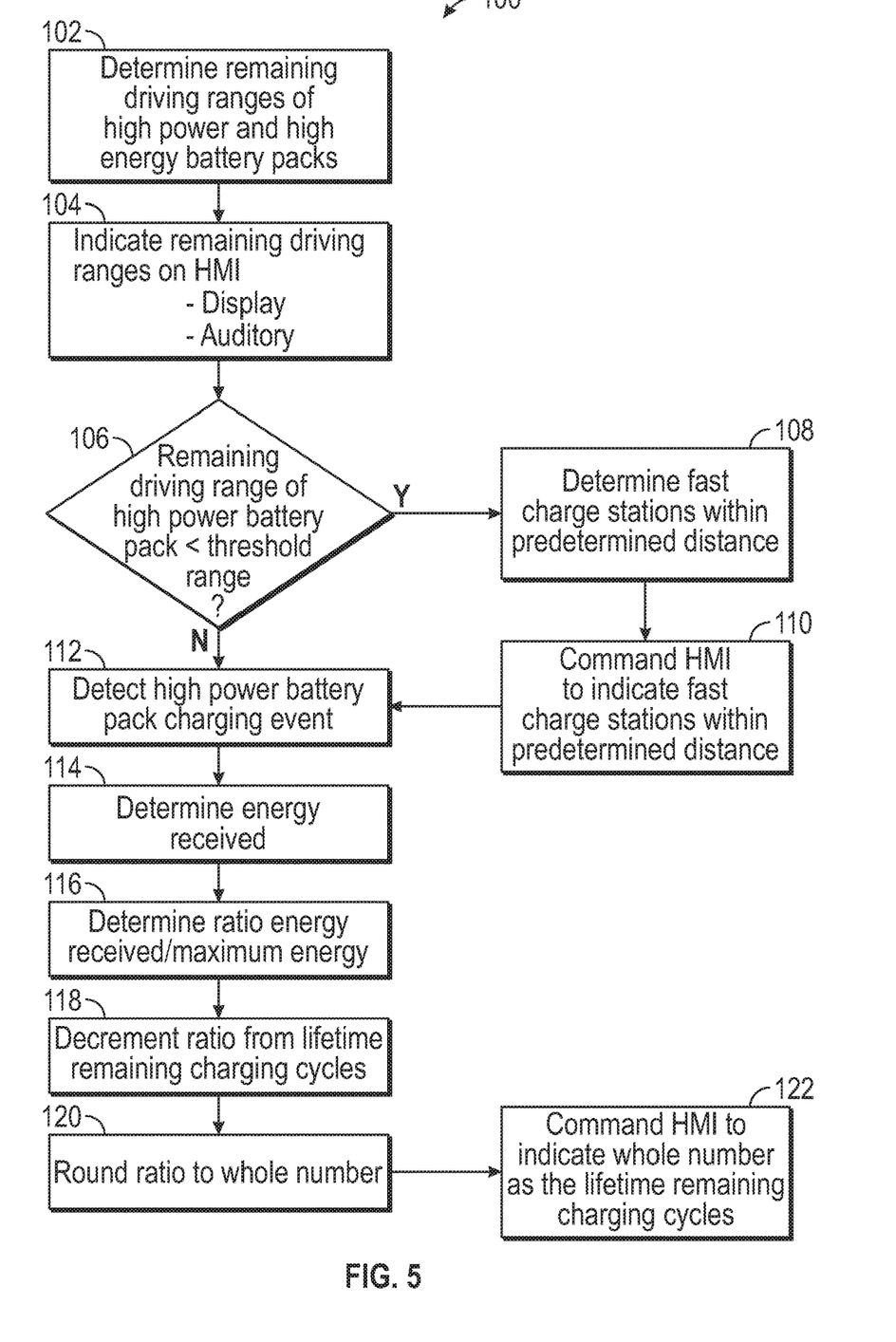
FIG. 5 is a flowchart of a method of monitoring the battery system of the electric vehicle.

In step 104, the controller 23 then commands the HMI 54 to indicate the remaining driving range of the high power battery pack 24 and the remaining driving range of the high energy battery pack 26. FIG. 3 depicts one embodiment of a display 58 by which the remaining driving ranges are indicated. More specifically, the remaining driving ranges are indicated as images 60, 62 of rotary gauges as described herein.

Next, in step 106, the controller 23 compares the remaining driving range of the high power battery pack 24 to a predetermined charge alert threshold driving range. More specifically, the controller 23 determines whether the remaining driving range of the high power battery pack 24 is less than the predetermined charge alert threshold driving range. If the remaining driving range of the high power battery pack 24 is less than the predetermined charge alert threshold driving range, then the method 100 moves to step 108, and the controller 23 determines, via the navigation system 56, one or more fast charge stations 31 within a predetermined distance of the vehicle 10, and then, in step 110, commands the HMI 54 to indicate the one or more charge stations 31 within the predetermined distance of the vehicle 10, such as by listing them on a display 58, as described with respect to FIG. 3. In the drawings, "Y" represents an affirmative answer to a query, and "N" represents a negative answer.

Following step 106, if the remaining driving range of the high power battery pack 24 is not less than the predetermined charge alert threshold driving range, or following step 110 if remaining driving range of the high power battery pack 24 is less than the predetermined charge alert threshold driving range, the electronic controller 23 detects the occurrence of a high energy battery pack 26 charging event in step 112. In step 114, the controller 23 determines an amount of energy received by the high energy battery pack 26 in the charging event, and then in step 116 determines a ratio of the amount of energy received by the high energy battery pack 26 to the maximum amount of energy of the high energy battery pack 26, as described herein.

Next, in step 118, the controller 23 decrements the ratio from lifetime remaining charging cycles. The electronic controller 23 is configured to track lifetime remaining charging cycles of the high energy battery pack 26 by, for each high energy battery pack 26 charging event, determining a rounded lifetime remaining charging cycle value by, in step 120, rounding the lifetime remaining charging cycles to a nearest whole number. In step 122, the controller 23 then commands the HMI 54 to indicate a number of remaining charging cycles of the high energy battery pack 26 based on the high energy battery pack 26 charging event. The number of remaining charging cycles the HMI 54 is commanded to display is the rounded lifetime remaining charging cycle value. Rounding the lifetime remaining charging cycles to a nearest whole number may include rounding lifetime remaining charging cycles value ending in a decimal greater than or equal to 0.5 up to the next whole number. The lifetime remaining charging cycles may have an initial value of the predetermined maximum number of charging cycles as explained herein.

While the best modes for carrying out the disclosure have been described in detail, those familiar with the art to which this disclosure relates will recognize various alternative designs and embodiments for practicing the disclosure within the scope of the appended claims.

What is claimed is:

1. A monitoring system for a vehicle, wherein the vehicle that has an electric motor for providing motive torque to vehicle wheels, the vehicle has a battery system including a first battery pack and a second battery pack, and the battery system is connectable with the electric motor, the monitoring system comprising:
    an electronic controller configured to determine a remaining driving range of the first battery pack and a remaining driving range of the second battery pack;
    a human-machine interface (HMI) operatively connectable to the electronic controller and configured to indicate the remaining driving range of the first battery pack and the remaining driving range of the second battery pack;
    wherein the HMI includes at least one display screen, and is operable to display the remaining driving range of only the first battery pack as a first image on the at least one display screen, and the remaining driving range of only the second battery pack as a second image on the at least one display screen; and
    wherein the first battery pack has a relatively high power density in comparison to the second battery pack, and the second battery pack has a relatively high energy density in comparison to the first battery pack.

2. The monitoring system of claim 1, wherein:
    the electronic controller is configured to detect a second battery pack charging event; and
    the HMI is operable to indicate the remaining charging cycles of the second battery pack based on the second battery pack charging event.

3. The monitoring system of claim 2, wherein:
    the second battery pack has a cycle life of a predetermined maximum number of charging cycles, each of the charging cycles including charging the second battery pack with a maximum amount of energy (Watt-hours) of the second battery pack; and
    the electronic controller is configured to track lifetime remaining charging cycles of the second battery pack by, for each second battery pack charging event:
        determining an amount of energy received by the second battery pack;
        determining a ratio of the amount of energy received by the second battery pack to a maximum amount of energy of the second battery pack; and
        decrementing the ratio from lifetime remaining charging cycles, wherein the lifetime remaining charging cycles has an initial value of the predetermined maximum number of charging cycles.

4. The monitoring system of claim 3, wherein the electronic controller is further configured to track lifetime remaining charging cycles of the second battery pack by, for each second battery pack charging event:
    determining a rounded lifetime remaining charging cycle value by rounding the lifetime remaining charging cycles to a nearest whole number; and
    wherein the number of remaining charging cycles the HMI is operable to indicate is the rounded lifetime remaining charging cycle value.

5. The monitoring system of claim 4, wherein rounding the lifetime remaining charging cycles to a nearest whole number includes rounding any lifetime remaining charging cycles value ending in a decimal greater than or equal to 0.5 up to the next whole number.

6. The monitoring system of claim 1, wherein the first image and the second image are displayed concurrently.

7. The monitoring system of claim 1, wherein the first image is a first rotary gauge, and the second image is a second rotary gauge.

8. The monitoring system of claim 1, wherein:
    the vehicle has a navigation system operatively connectable to the electronic controller; and
    the electronic controller is configured to:
        compare the remaining driving range of the first battery pack to a predetermined charge alert threshold driving range;
        determine, via the navigation system, one or more charge stations within a predetermined distance of the vehicle if the remaining driving range of the first battery pack is less than the predetermined charge alert threshold driving range; and
        command the HMI to indicate the one or more charge stations within the predetermined distance of the vehicle.

9. The monitoring system of claim 8, wherein the HMI is operable to indicate the one or more charge stations within the predetermined distance of the vehicle by listing the one or more charge stations within the predetermined distance of the vehicle on the at least one display screen.

10. A method of monitoring a vehicle battery system of a vehicle, the method comprising:
    determining, via an electronic controller, a remaining driving range of a first battery pack of the vehicle battery system, and a remaining driving range of a second battery pack of the vehicle battery system;
    wherein the vehicle battery system is connectable with an electric motor operable for providing motive torque to vehicle wheels;
    commanding, via the electronic controller, a human-machine interface (HMI) operatively connected to the electronic controller to indicate the remaining driving range of the first battery pack and the remaining driving range of the second battery pack;
    wherein the HMI includes at least one display screen, the remaining driving range of only the first battery pack is displayed as a first image on the at least one display screen, and the remaining driving range of only the second battery pack is displayed as a second image on the at least one display screen; and
    wherein the first battery pack has a relatively high power density in comparison to the second battery pack, and the second battery pack has a relatively high energy density in comparison to the first battery pack.

11. The method of claim 10, wherein the first image and the second image are displayed concurrently.

12. The method of claim 10, wherein the first image is a first rotary gauge, and the second image is a second rotary gauge.

13. The method of claim 10, wherein a navigation system is operatively connectable to the electronic controller, and the method further comprising:
   comparing the remaining driving range of the first battery pack to a predetermined charge alert threshold driving range;
   determining, via the navigation system, one or more charge stations within a predetermined distance of the vehicle if the remaining driving range of the first battery pack is less than the predetermined charge alert threshold driving range; and
   commanding the HMI to indicate the one or more charge stations within the predetermined distance of the vehicle.

14. The method of claim 13, wherein:
   the HMI includes a display screen; and
   the HMI indicates the one or more charge stations within the predetermined distance of the vehicle by listing the one or more charge stations within the predetermined distance of the vehicle on the display screen.

15. The method of claim 10, further comprising:
   detecting any second battery pack charging event; and
   commanding the HMI to indicate a number of remaining charging cycles of the second battery pack based on the second battery pack charging event.

16. The method of claim 15, wherein the second battery pack has a cycle life of a predetermined maximum number of charging cycles, each of the charging cycles including charging the second battery pack with a maximum amount of energy (Watt-hours) of the second battery pack; and the method further comprising, for each second battery pack charging event:
   determining an amount of energy received by the second battery pack;
   determining a ratio of the amount of energy received by the second battery pack to the maximum amount of energy of the second battery pack; and
   decrementing the ratio from lifetime remaining charging cycles, wherein the lifetime remaining charging cycles has an initial value of the predetermined maximum number of charging cycles.

17. The method of claim 16, wherein the electronic controller is further configured to track lifetime remaining charging cycles of the second battery pack by, for each second battery pack charging event:
   determining a rounded lifetime remaining charging cycle value by rounding the lifetime remaining charging cycles to a nearest whole number; and
   wherein the number of remaining charging cycles the HMI is commanded to display is the rounded lifetime remaining charging cycle value.

18. The method of claim 17, wherein rounding the lifetime remaining charging cycles to a nearest whole number includes rounding any lifetime remaining charging cycles value ending in a decimal greater than or equal to 0.5 up to the next whole number.

\* \* \* \* \*